May 14, 1946.  F. L. FULKE  2,400,230
LUBRICATION FOR MINING MACHINE CHAINS
Filed June 4, 1943

INVENTOR.
FRANK L. FULKE,
BY Hood & Hahn
ATTORNEYS.

Patented May 14, 1946

2,400,230

UNITED STATES PATENT OFFICE 2,400,230

LUBRICATION FOR MINING MACHINE CHAINS

Frank L. Fulke, Terre Haute, Ind., assignor to Frank Prox Company, Inc., Terre Haute, Ind., a corporation of Indiana Application June 4, 1943, Serial No. 489,604

5 Claims. (Cl. 74—257)

So far as I am aware there never has been any practicable solution of the problem of lubricating the joints of cutter chains, of mining machines, probably because of the extreme difficulties peculiar to the problem. There can be no question of the longer wearing qualities of a lubricated chain joint, yet today we find a large proportion of the cutter chains that are in use in coal mines, regardless of their make or type, running day after day without any effort to provide any lubricant at their joints. The most usual attempt at lubricating the chain is to pour a large quantity of cheap inferior oil upon the upper surface of the chain. This may help reduce the friction of the chain running in its guides but little or none of the oil reaches the vital joints in the chain. If it does it is poor quality lubricant, carries in with it a lot of dust etc., and any anti-friction value it might have is extremely limited and temporary. One great difficulty is that there is no provision to lead or force the lubricant being poured on the chain directly to the joint or to retain it there, in fact the construction of cutter chains provides an almost perfect shield to prevent oil thus poured on from reaching the joints.

Another difficulty is the fact that coal cutting produces a cloud of dust so fine as to resemble smoke, and it has never been found practicable to prevent this dust entering the joint along with the oil, and often it is highly abrasive as when rock or hard impurities are cut with the coal. For this reason even though a lubricant were actually supplied into the joints at frequent enough intervals to insure that some lubricant would always be present, it might under abrasive cutting conditions be worse than providing no lubricant at all. A paste of lubricant and abrasive dust is used for grinding valves but it is not so good for a chain joint as to just let the dust run through or shake off. As a matter of fact, machine men neglect lubricating the chains over long periods, even when it is provided for.

In my present improvement I have contrived my organization so as to solve these problems.

Figure 1:
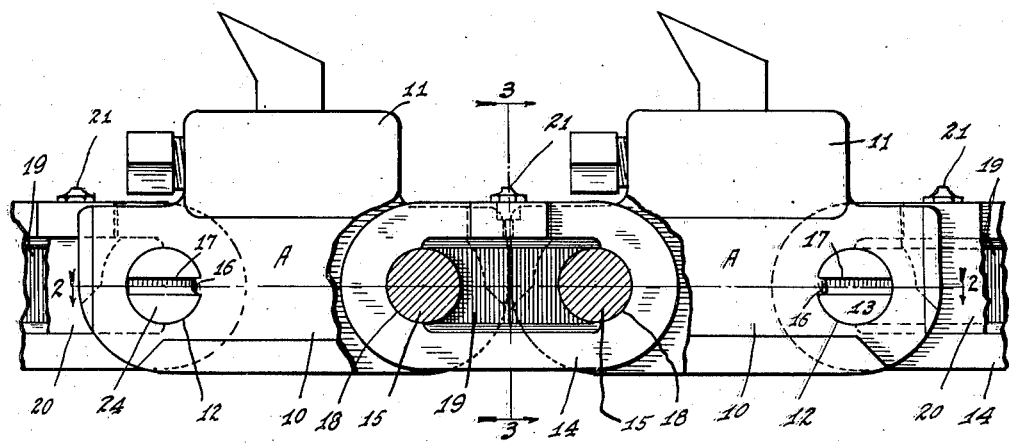
Figure 2:
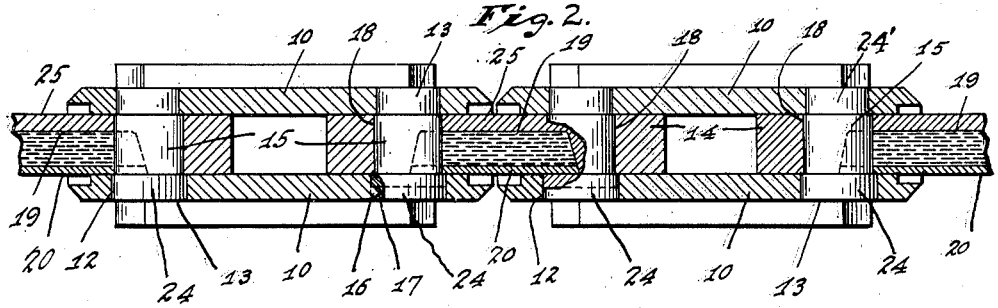

The accompanying drawing illustrates an embodiment of my invention:

Fig. 1 is a plan, in partial horizontal section of a short section of chain;

Fig. 2 a section on line 2—2 of Fig. 1; and

Figure 3:
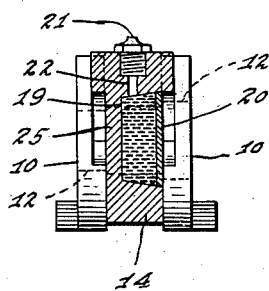

Fig. 3 a section on line 3—3 of Fig. 1.

Chains of this type operate in a substantially horizontal plane around sprocket wheels having vertical axes.

In the drawing, A indicates a bit-block link comprising a pair of laterally spaced side plates 10, 10 which are connected together centrally of their upper edges by an integral bit carrying head bridge 11. At their portions beyond bridge 11 these side plates are pierced by aligned journal openings 12, 12 for supporting non-rotatively the ends of a journal pin 13 upon which is swiveled a connecting link 14. Pin 13 is formed with a large upper end diameter 24, a smaller lower end 24' and an intermediate diameter 15 which is the surface upon which connecting link 14 swivels. Pin 13 may therefore be inserted from above, cannot drop through the link, and is prevented from rotating and from upward displacement by deformation 16 into a groove 17 in the head of pin 13. Connecting link 14 is of thickness suitable to fit between side plates 10 and at its opposite ends is perforated by journal openings 18 for swiveling on the pins 13.

In its side, which in the normal cutting operation of the chain is its upper side, link 14 has a deep indentation 19 throughout the area lying between both journal openings 18. This indentation 19 is formed when the link is drop-forged, to a depth over half the thickness of the link. A plate 20 pressed into the indentation 19 closes indentation 19 to form a large central cavity in link 14 adapted to hold a very considerable amount of soft semi-fluid grease. A grease fitting 21 at the outer edge of link 14 permits grease to be injected through duct 22 into this large cavity. When the journal holes 18 are filled by pins 13 it will be seen that cavity 19 is completely sealed except for the extremely slight tolerance between the pins 13 and the walls of journal openings 18. This would not permit a semifluid soft grease to run out but it would prevent, in very large measure, the entry into cavity 19 of any fine coal or abrasive dust, especially when the shielding effect of overlying plates 10 is considered, also the stepped down diameters of pins 13.

It should be noted that, with exception of thin plate 20 and thin side 25 of link 14, which constitutes the floor of cavity 19, all of the thickness of link 14 is occupied by cavity 19, and that cavity 19 is so extended endwise of link 14 that without pins 13 in place the journal openings 18 themselves are a part of the grease cavity 19. The extreme end boundaries of the cavity therefore actually become the pulling sides of both of the journal openings. Consequently, when the journal pins are in position the entire surface of their middle portions lying between plate 20 and cavity floor 25 will be constantly immersed in and directly bathed by the soft grease in cavity 19. Due to the jerks of starting and stopping the chain, the supply of soft semi-fluid grease in the cavity will be able to splash and wash these pin surfaces, and a slight amount of lubricant, as link 14 swivels on pin 13, will work its way into the unbathed wearing surfaces of pins 13 and the frictioning side surfaces of links 14 and plates 10. Such small increments of grease as do work out of cavity 19 will tend to carry out any dust or particles trying to come into cavity 19. At suitable intervals fresh grease is quickly and conveniently injected into the cavity 19 through duct 22 and grease contaminated with dust forced out by pressure.

The journal opening, where it passes through thin side 25 of link 14, is fully circular to closely fit the cylindrical pin and so prevent any axial displacement of the journal opening relative to the axis of the pin as the chain is pushed or pulled or jerked in operation.

I am aware that grease cavities have been provided in other organizations for supplying lubricant through holes or ducts or other apertures to reach a bearing surface but such conventional methods would not meet the peculiar and exacting problems involved in cutter chain joint lubrication for reasons explained. None of such conventional applications operate in a cloud of abrasive dust and grit for example, and if applied to a cutter chain such holes or ducts would quickly be clogged by a solid plug of mixed grease and dust. I am not aware of any organization in which both journal holes in a link are deliberately made a co-part of a central sealed grease cavity by eliminating a major part of the inside walls of such journal holes so as to expose a maximum surface of both journal pins to a direct constant immersion in a pool of lubricant extending between and overlapping both journal holes. Such a grease cavity could conceivably be sand cored in a cast link, but for many years I have considered drop-forged links far superior to castings for cutter chain service, and so do people who buy and use cutter chains.

It is to be noted that I contrive to provide in my link a sealed grease cavity of really large size, occupying as it does the entire central portion of the link, yet I have not sacrificed any of the strength of the link to resist breaking. Also that my link is soundly practicable to produce at reasonable cost; in fact the value of the steel displaced by my cavity should easily pay for stamping plate 20 and pressing it into place, thereby avoiding increased cost to the user of the chain for these improvements.

I claim as my invention:

1. As an article of manufacture, a link for a chain formed with a bore defining a journal surface and further formed with an internal cavity larger than and including a partial portion of said bore internally of said link, said internal cavity having a boundary definable as the pulling side of said bore, said bore having a peripheral extent of 360° for only that minor portion of its axial length extending beyond the floor of said cavity, and being only part cylindrical at all points extant from said cavity floor, and a steel plate closing said cavity and recessed into said link and provided with a part-circular configuration complementary to the center of the radius of said bore.

2. A chain link comprising a main body formed, adjacent each of its opposite ends, with a transverse perforation, said perforations being located upon substantially parallel axes, and said body further being formed with a lubricant-receiving cavity, the extent of said cavity in each direction from the plane common to the axes of said perforations being at least equal to the radius of one of said perforations, throughout the region between said axes.

3. As an article of manufacture, an internal connecting link for a chain, said link being provided, adjacent each of its opposite ends, with a journal opening adapted, when said link is incorporated in a chain and such chain is in position of use, to have its axis substantially vertically positioned, said link being formed in its upper side with a lubricant cavity extending in depth more than half the link thickness, extending lengthwise of said link to encompass entirely said journal openings, and extending laterally of said link so that each of said journal openings may be defined as fully cylindrical only at its lower portion below the floor of said cavity and only part-cylindrical at all points above said cavity floor, and means to seal a lubricant in said cavity comprising a metal plate disposed entirely below the upper surface of said link and closing said lubricant cavity, said plate being formed part circular at each end to conform to the contour of journal pins received in said journal openings.

4. In a cutter chain, a central connecting link provided with journal openings adjacent its opposite end portions, said opposite end portions being positioned between bifurcated arms of adjacent bit-carrying links and being connected thereto by journal pins passing vertically through said arms and through said journal openings in said connecting link and locked non-rotatively to said arms, a lubricant cavity formed in the upper side of said connecting link extending lengthwise of said link to encompass entirely said journal openings, whereby said journal openings are defined as fully cylindrical only at their lower portions below the floor of said cavity and only part-cylindrical at all points above said floor, and means to seal a lubricant in said cavity comprising a metal plate disposed wholly below the upper surface of said link and closing said cavity, said plate having at each opposite end a part-circular indentation conforming to the contour of the journal pin passing through the adjacent journal opening of said connecting link.

5. In a chain comprising outer links bifurcated to provide arms overlapping an inner link sized to lie inside of said arms, a pair of journal pins passing through journal openings adjacent the opposite end portions of said inner link and passing through and locked in said arms against axial and rotary movement with respect thereto, means in said inner link to permanently lubricate both said journal pins comprising a body of lubricant in a lubricant cavity extending in depth more than half the link thickness, extending lengthwise of said link to bodily encompass both said journal openings, extending laterally of said link so that each of said journal openings may be defined as fully cylindrical only for that minor portion of its axial extent lying below the floor of said cavity and only part-cylindrical at all points above said cavity floor, and means to seal a lubricant in said cavity comprising a metal plate retained in position between said inner link and the inner face of one of said overlapping arms and recessed into said inner link and having ends of a part-circular configuration complementary to the radii of said journal pins.

FRANK L. FULKE.